United States Patent [19]

Householder

[11] 3,856,701

[45] Dec. 24, 1974

[54] ANTIFOAM COMPOSITION

[75] Inventor: Kermit W. Householder, Tonawanda, N.Y.

[73] Assignee: Dow Corning Corporation, Midland, Mich.

[22] Filed: Apr. 9, 1973

[21] Appl. No.: 349,605

Related U.S. Application Data

[62] Division of Ser. No. 144,263, May 17, 1971, Pat. No. 3,763,021.

[52] U.S. Cl. ............................... 252/358, 252/321
[51] Int. Cl. .......................................... B01d 19/04
[58] Field of Search .................................. 252/358

[56] References Cited
UNITED STATES PATENTS

| | | | |
|---|---|---|---|
| 3,233,986 | 2/1966 | Morehouse | 252/358 X |
| 3,402,192 | 9/1968 | Haluska | 260/448.2 B |

FOREIGN PATENTS OR APPLICATIONS

| | | | |
|---|---|---|---|
| 724,623 | 12/1965 | Canada | 252/358 |

*Primary Examiner*—Richard D. Lovering
*Attorney, Agent, or Firm*—Jack E. Moermond

[57] ABSTRACT

An antifoam composition is disclosed which consists essentially of (1) 1 to 20 percent by weight of a siliconeglycol copolymer, (2) 65 to 98 percent by weight of a propylene glycol, and (3) 1 to 15 percent by weight of a hydrophilic silica which is preferably treated in situ. The composition is particularly useful in latexes.

4 Claims, No Drawings

ANTIFOAM COMPOSITION

This is a division of application Ser. No. 144,263, filed May 17, 1971, now U.S. Pat. No. 3,763,021.

This invention relates to an antifoam or defoaming composition. More specifically, this invention relates to such a composition which consists essentially of (1) 1 to 20 percent by weight of a silicone-glycol copolymer having the general formula

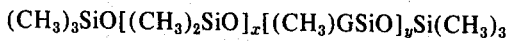

wherein $x$ has an average value from 6 to 420, $y$ has an average value from 3 to 30, and G is a radical of the structure $-D(OR)_zA$ wherein D is an alkylene radical, R is composed of ethylene radicals and radicals selected from the group consisting of propylene and butylene radicals, the amount of ethylene radicals relative to the other alkylene radicals being such that the ratio of carbon atoms to oxygen atoms in the total OR blocks ranges from 2.3:1 to 2.8:1, $z$ has an average value from 25 to 100, and A is a capping group, (2) 65 to 98 percent by weight of polypropylene glycol having an average molecular weight in the range of 1000 to 2000, and (3) 1 to 15 percent by weight of a hydrophobic silica.

The depression and/or suppression of foam in many systems is a problem. Each system is unique and requires it's own antifoamer or defoamer. And while a particular composition may function well as an antifoam, it may at the same time introduce a new problem. The foregoing is true of latex systems.

It is an object of this invention to provide a new antifoam or defoaming composition which is particularly useful in latexes.

By way of example, during the preparation of styrene-butadiene latexes in emulsion the conversion of monomers to polymer is terminated at about 70 to 75% conversion as higher conversions yield polymers with inferior properties. The unreacted butadiene is generally removed by flashing at atmospheric and then reduced pressures. Finally, the unreacted styrene is removed by steam stripping (distilling) where foaming is a problem. Acrylonitrile-butadiene latexes are made by an analogous process. Other synthetic latexes also present similar foaming problems during preparation. Therefore, another object of this invention is to provide an antifoam composition which can be used in latexes, which composition significantly reduces the foaming problems during preparation.

Another object of this invention is to provide an antifoam composition which can be used in latexes which composition does not cause fisheyeing when the latex is subsequently used in making coating compositions.

Yet another object is to provide an antifoam composition whose performance does not fade towards the end of processing.

Other objects and advantages of this invention will be apparent from the following description and examples.

The first component of the composition of this invention is a silicone-glycol copolymer having the general formula $(CH_3)_3SiO[(CH_3)_2SiO]_x[(CH_3)GSiO]_ySi(CH_3)_3$. In this copolymer the number of dimethylsiloxane units, as defined by $x$ can range from 6 to 420. Preferably $x$ has an average value of 50 to 100.

The number of methyl-glycol siloxane units in the copolymer is defined by $y$ which can have an average value ranging from 3 to 30 but which preferably falls in the range of 5 to 10.

The glycol portion of the copolymer is designated as G which is defined as a radical of the structure $-D(OR)_zA$. The glycol is attached to the silicon atom via alkylene radical D which contains from 1 to 30 carbon atoms and which preferably contains from 1 to 18 carbon atoms. Specific examples of D are the methylene, ethylene, propylene, isopropylene, butylene, octylene, decylene, octadecylene and myricylene radicals.

The (OR) portion of the glycol radical defines the alkylene oxide which constitutes the backbone of the glycol. It can consist of ethylene oxide units (R is an ethylene radical) and propylene oxide units (R is a propylene radical), ethylene oxide units and butylene oxide units (R is a butylene radical), or ethylene oxide units with propylene oxide units and butylene oxide units. However, the proportion of the ethylene oxide to the other alkylene oxides must be such that the ratio of carbon atoms to oxygen atoms in the total (OR) block ranges from 2.3:1 to 2.8:1. The total number of (OR) groups is defined by $z$ which has an average value from 10 to 100.

The A radical in the glycol portion of the copolymer is a capping group. By way of illustration, the glycol can be hydroxy, acyl, ether or carbonate ester capped. Preferably there is no more than a total of 15 atoms in A.

The silicone-glycol copolymers described above are well known materials with some of them being commercially available. For those unfamiliar with them attention is directed to U.S. Pat. No. 3,402,192 whose disclosure is incorporated by reference. This patent sets forth typical methods of preparation and a more detailed description of these materials.

The silicone-glycol can amount to 1 to 20 percent by weight of the total composition. It is preferable, however, that it be present in an amount ranging from 6 to 10 percent.

The second component of the composition of this invention is a propylene glycol. These glycols are also commercially available materials. It has been found that in addition to being a propylene glycol, the molecular weight must be in the range of 1000 to 2000 with a molecular weight range of 1000 to 1500 being preferred. The amount of this component can be from 65 to 98 percent by weight but is preferably in the range of 75 to 90 percent.

The third and last component of the composition of this invention is a hydrophobic silica.

A hydrophobic silica is one which has had its surface hydroxyl groups removed, generally by the reaction with an organofunctional silicone such as trimethylmethoxysilane, trimethylchlorosilane, hexamethyldisiloxane or hexamethyldisilazane. However, materials such as stearyltrichloride can also be used to treat the silica. The reaction or treatment of the silica with the silicone renders the silica hydrophobic as compared to its original hydrophilic nature. It has been found essential to obtain the best results in accordance with this invention that the silica be treated in situ; that is, the silica must be reacted with the silicone or other treating agent during the preparation of the antifoam composition rather than being treated separately prior to the silica being admixed with the other components of the composition.

The amount of the silica present in the composition can be from 1 to 15 percent by weight but is preferably in the range of 6 to 10 percent.

The particular amount of the antifoam composition of this invention to be used for antifoaming purposes varies widely. Such factors as the type of product having the foam problem, the process involved, the equipment being used, and the extent to which one wishes to control the foaming determine the amount used. Thus it is difficult to set any meaningful numerical limitations as to the amount of antifoam composition to be employed. In practice, for example, anywhere from 5 parts of antifoam composition per million parts of composition being defoamed to 5 percent by weight of antifoam composition based on the weight of the composition being defoamed may be used with satisfactory results depending on the situation.

Now in order that those skilled in the art may better understand how the present invention can be practiced, the following examples are given by way of illustration and not by way of limitation. All parts and percents referred to herein are on a weight basis unless otherwise specified.

In the examples, performance of the antifoam compositions was evaluated by placing 300 ml. of unstripped latex in a 32 ounce bottle. The latex was then heated to 90°C. by placing the bottle containing the latex in a boiling water bath. After 90°C. was reached the antifoam composition was added to the latex and steam blown through the latex. Shortly after the steam is introduced the unreacted monomers begin to distill from the system causing foaming. A maximum foam height of less than 9 cm. is considered as passing the test.

After the latex had been stripped it was allowed to cool to room temperature. It was then filtered by passing it through 100 mesh and 325 mesh screens. The particles removed during filtration are preflock. Large amounts of preflock are undesirable.

A 0.003 inch thick film of the latex was cast on a clean glass plate. If less than 5 fisheyes were observed in a 1-½ × 7 strip the antifoam composition passed the test.

EXAMPLE 1

An antifoam composition consisting essentially of about 4.2% of a silicone-glycol copolymer of the formula

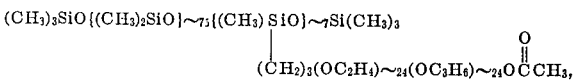

about 87.5% of propylene glycol having an average molecular weight of about 1200 and about 8.3% of a pretreated hydrophobic silica was prepared as follows. 4% of hexamethyldisilazane and 8% of a non-hydrophobic silica (Quso G—30) were mixed together whereby the silica was treated and became hydrophobic. Then 84% of the polypropylene glycol was added and mixed in and finally 4% of the silicone-glycol copolymer was mixed in and the product colloid milled at a setting of 10 .

A second antifoam composition was prepared for purposes of comparison which was identical to the one above except that it contained none of the silicone-glycol copolymer and 88% of the polypropylene glycol was used in the preparation.

Both of the above antifoam compositions were evaluated by adding 1 cc. to a styrene-butadiene latex in the above-described test. The first composition, which represents this invention, gave good foam control. The second composition, made for purposes of comparison, gave good initial foam control but faded at the end of the test which was undesirable. Both compositions passed the preflock and fisheye tests.

EXAMPLE 2

An antifoam composition consisting essentially of about 8.3% of a silicone-glycol copolymer of Example 1, about 83.3% of propylene glycol having an average molecular weight of about 1200 and about 8.3% of a hydrophobic silica treated in situ was prepared as follows. 4% hexamethyldisilazane and 40% of polypropylene glycol were mixed together and then added to 8% of a non-hydrophobic silica (Quso G—30) and mixed. Next another 40% of polypropylene glycol was mixed in and then the mixture heated at 75° to 90°C. while mixing. Finally 8% of the above silicone-glycol copolymer was mixed and the product colloid milled at a setting of 15 mils.

A second antifoam composition identical to the one above was prepared as follows. 4% of hexamethyldisilazane and 80% propylene glycol were mixed together. To this mixture 8% silica was added while mixing and heating at 75° to 90°C. Then 8% of the silicone-glycol copolymer was mixed in and the product colloid milled at a setting of 15 mils.

Both of the above antifoam compositions were evaluated by adding 1 cc. to a styrene-butadiene latex in the above described test. Both compositions passed the test and were considered to be very good antifoams. The antifoam test was run for an extended time by adding styrene monomer to the latex as stripping was carried out. The first composition was run for one-half hour and the second composition for 1 hour. In both cases the antifoam composition failed only after the monomer was completely gone. Both compositions also passed the preflock and fisheye tests.

EXAMPLE 3

When the procedure of the preceding examples is carried out using acrylonitrile-butadiene rubber latexes, the antifoam compositions of this invention reduce the amount of foaming during the monomer stripping, and no preflock or fisheyeing problems are encountered.

EXAMPLE 4

When the antifoam compositions set forth below are substituted for the antifoam compositions of Examples 1-3, there is a significant reduction in foaming, and no preflock or fisheyeing problems are encountered.

A. A composition consisting essentially of 1% of a silicone-glycol copolymer having the formula

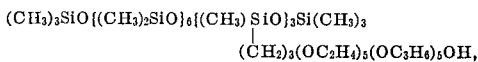

98% of polypropylene glycol having a molecular weight of about 1000, and 1% of a hydrophobic silica treated in situ with trimethylchlorosilane.

B. A composition consisting essentially of 15% of a silicone-glycol copolymer having the formula

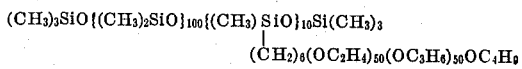

75% of polypropylene glycol having a molecular weight of about 2000, and 10% of a hydrophobic silica treated in situ with stearyl trichloride.

C. A composition consisting essentially of 20% of a silicone-glycol copolymer having the formula

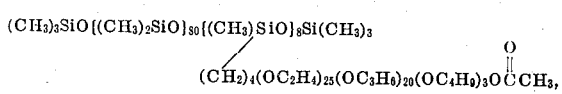

65% of polypropylene glycol having a molecular weight of about 1500, and 15% of a hydrophobic silica treated in situ with hexamethyldisiloxane.

That which is claimed is:

1. An antifoam composition which consists essentially of
   1. 1 to 20 percent by weight of a silicone-glycol copolymer having the general formula $$(CH_3)_3SiO[(CH_3)_2SiO]_x[(CH_3)GSiO]_ySi(CH_3)_3$$

wherein
   $x$ has an average value from 50 to 100,
   $y$ has an average value from 5 to 10, and
   G is a radical of the structure $-D(OR)_zA$ wherein
   D is an alkylene radical containing from 1 to 30 carbon atoms,
   R is composed of ethylene radicals and radicals selected from the group consisting of propylene and butylene radicals, the amount of ethylene radicals relative to the other alkylene radicals being such that the ratio of carbon atoms to oxygen atoms in the total OR blocks ranges from 2.3:1 to 2.8:1,
   $z$ has an average value from 25 to 100, and
   A is a capping group selected from the group consisting of hydroxy, acyl, ether and carbonate ester capping groups,
   2. 65 to 98 percent by weight of polypropylene glycol having an average molecular weight in the range of 1000 to 2000, and
   3. 1 to 15 percent by weight of a hydrophobic silica.

2. An antifoam composition as defined in claim 1 consisting essentially of 6 to 10 percent of (1), 75 to 90 percent of (2), and 6 to 10 percent of (3), the hydrophobic silica (3) having been treated in situ.

3. An antifoam composition as defined in claim 2 wherein in (1) D contains from 1 to 18 carbon atoms, and R is composed of only ethylene and propylene radicals, and (2) has an average molecular weight in the range of 1000 to 1500.

4. An antifoam composition as defined in claim 3 wherein (1) has the general formula

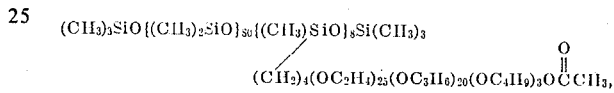

(2) is a propylene glycol having an average molecular weight of about 1200, and (3) is a hydrophobic silica treated in situ with hexamethyldisilazane.

* * * * *

UNITED STATES PATENT OFFICE
CERTIFICATE OF CORRECTION

Patent No. 3,856,701      Dated December 24, 1974

Inventor(s) Kermit W. Householder

It is certified that error appears in the above-identified patent and that said Letters Patent are hereby corrected as shown below:

Column 6, lines 25 through 29, change the formula $$(CH_3)_3SiO\{(CH_3)_2SiO\}_{80}\{(CH_3)SiO\}_8Si(CH_3)_3 \atop (CH_2)_4(OC_2H_4)_{25}(OC_3H_6)_{20}(OC_4H_9)_3O\overset{O}{\overset{\|}{C}}CH_3$$

to read $$(CH_3)_3SiO\{(CH_3)_2SiO\}{\sim}_{75}\{(CH_3)SiO\}{\sim}_7Si(CH_3)_3 \atop (CH_2)_3(OC_2H_4){\sim}_{24}(OC_3H_6){\sim}_{24}O\overset{O}{\overset{\|}{C}}CH_3$$ --.

Signed and sealed this 8th day of April 1975.

(SEAL)
Attest:

RUTH C. MASON
Attesting Officer

C. MARSHALL DANN
Commissioner of Patents
and Trademarks

FORM PO-1050 (10-69)      USCOMM-DC 60376-P69
U.S. GOVERNMENT PRINTING OFFICE: 869-930